United States Patent
Liu et al.

(10) Patent No.: US 8,219,727 B2
(45) Date of Patent: Jul. 10, 2012

(54) BRIDGE DEVICE FOR A DISK DRIVE

(75) Inventors: Chih-Sheng Liu, Taipei (TW);
Ming-Hsun Liu, Taipei (TW)

(73) Assignee: Datatronics Technology, Inc., Taipei (TW)

( * ) Notice: Subject to any disclaimer, the term of this patent is extended or adjusted under 35 U.S.C. 154(b) by 566 days.

(21) Appl. No.: 12/033,973

(22) Filed: Feb. 20, 2008

(65) Prior Publication Data
US 2009/0210605 A1    Aug. 20, 2009

(51) Int. Cl.
*G06F 13/38* (2006.01)
(52) U.S. Cl. ............................. 710/62; 710/64
(58) Field of Classification Search ............ 710/62
See application file for complete search history.

(56) References Cited

U.S. PATENT DOCUMENTS

| 6,928,557 | B1 * | 8/2005 | Inoue et al. ............. 726/35 |
| 2002/0012531 | A1 * | 1/2002 | Flannery ............. 386/126 |
| 2005/0068878 | A1 * | 3/2005 | Itoh et al. ............. 369/84 |

FOREIGN PATENT DOCUMENTS

| EP | 0 423 986 A3 | 4/1991 |
| EP | 1 096 359 A3 | 5/2001 |
| EP | 1 475 704 A2 | 11/2004 |
| EP | 1 657 646 A1 | 5/2006 |
| WO | 00/05882 A1 | 2/2000 |

OTHER PUBLICATIONS

UKIPO Combined Search and Examination Report dated Apr. 10, 2008 of corresponding UK Application No. GB0803480.3.

* cited by examiner

*Primary Examiner* — Henry Tsai
*Assistant Examiner* — John Roche
(74) *Attorney, Agent, or Firm* — Pearne & Gordon LLP

(57) ABSTRACT

A bridge device for a disk drive has the I/O terminals to which an external automatic controlling apparatus is connected, so the external automatic controlling apparatus directly controls a disk tray of the disk drive to move in or move out without a computer. In addition, the bridge device also further has a computer connecting port, to which the external computer is connected. The computer controls operations of the disk drive.

6 Claims, 4 Drawing Sheets

BRIDGE DEVICE FOR A DISK DRIVE

BACKGROUND OF THE INVENTION

1. Field of the Invention

The present invention relates to a bridge device for a disk drive, especially to a bridge device having a disk tray controlling interface that allows an external automatic controlling apparatus to control the disk tray of the disk drive to move in or out and to obtain the present status of the disk tray.

2. Description of Related Art

A general disk drive requires a bridge device to communicate with a computer, since the disk drive and the computer uses different data format.

With reference to FIG. 6, the disk drive (50) is electronically connected to the computer (40). The computer (40) has a USB port (41). Since the bridge device (51) also has an USB port (511), the USB port (511) of the bridge device (51) is connected to the USB port (41) of the computer (40). The bridge device (51) converts disk data from the disk drive (50) to computer data format or converts computer data from the computer (40) to disk data format. Therefore, the computer (40) outputs controlling commands to drive the disk drive (50) and then obtains disk data and disk tray status.

Based on the foregoing description, the disk drive can be driven by the computer through the bridge device. However, since the present automatic controlling apparatus controls multiple disk drives to operate, the computer or computers are necessary. Therefore, the cost of controlling multiple disk drives by the automatic controlling apparatus is not cheap.

SUMMARY OF THE INVENTION

The main objective of the present invention is to provide a bridge device of a disk drive that allows an external electronic apparatus to only control the disk tray to move in or move out.

The bridge device for a disk drive has the I/O terminals to which an external apparatus is connected, so the external apparatus directly controls disk tray of the disk drive to move in or move out without a computer. In addition, the bridge device also further has a computer connecting port, to which the external computer is connected. The computer controls operations of the disk drive.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
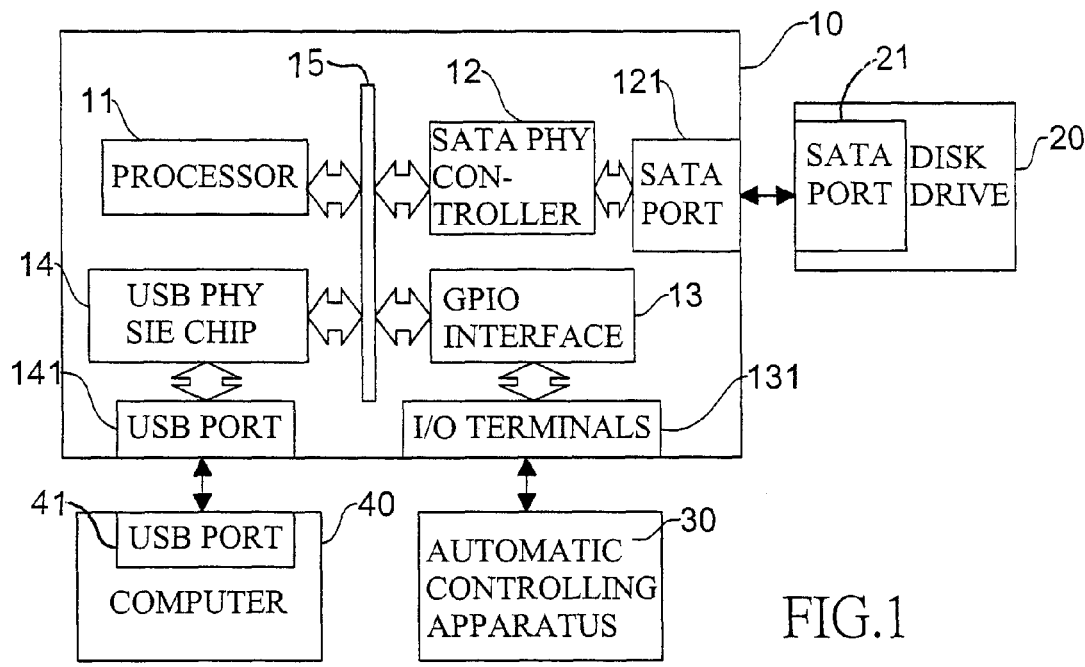
FIG. 1 is a functional block diagram of a first embodiment of a bridge device of a disk drive in accordance with the present invention.

With reference to FIG. 1, a bridge device (10) for a disk drive (20) has a disk connecting port (121), a disk connecting interface (12), multiple input and output (I/O) terminals (131), a disk tray controlling interface (13), a data bus (15) and a processor (11), and may have a computer connecting port (141) and a computer connecting interface (14).

Figure 2:
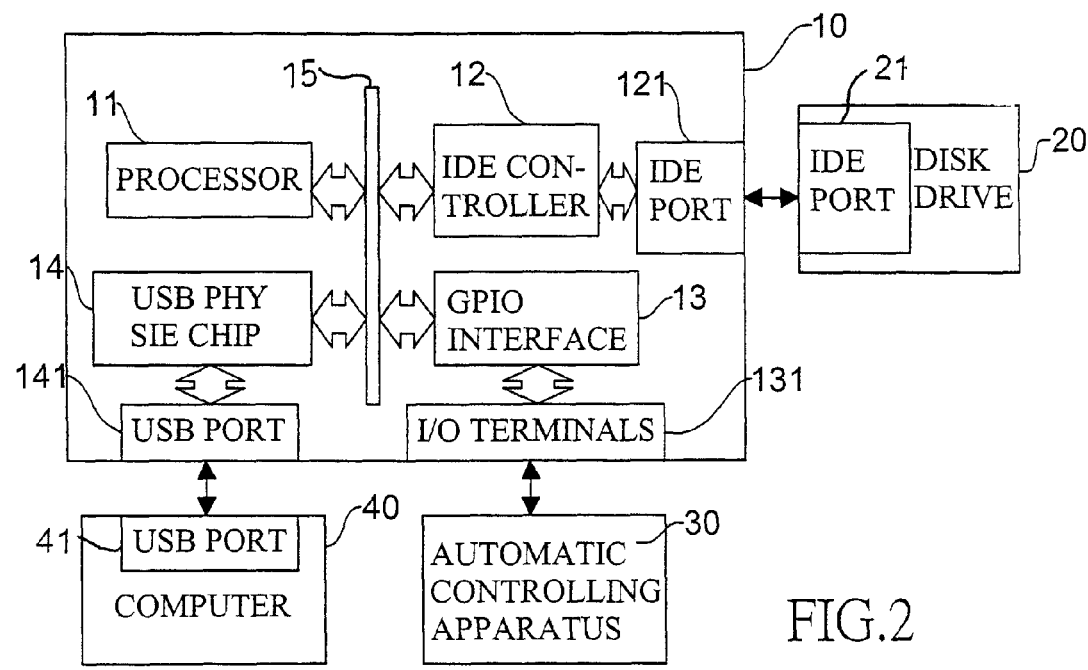
FIG. 2 is a functional block diagram of a second embodiment of a bridge device of a disk drive in accordance with the present invention.
Figure 4:
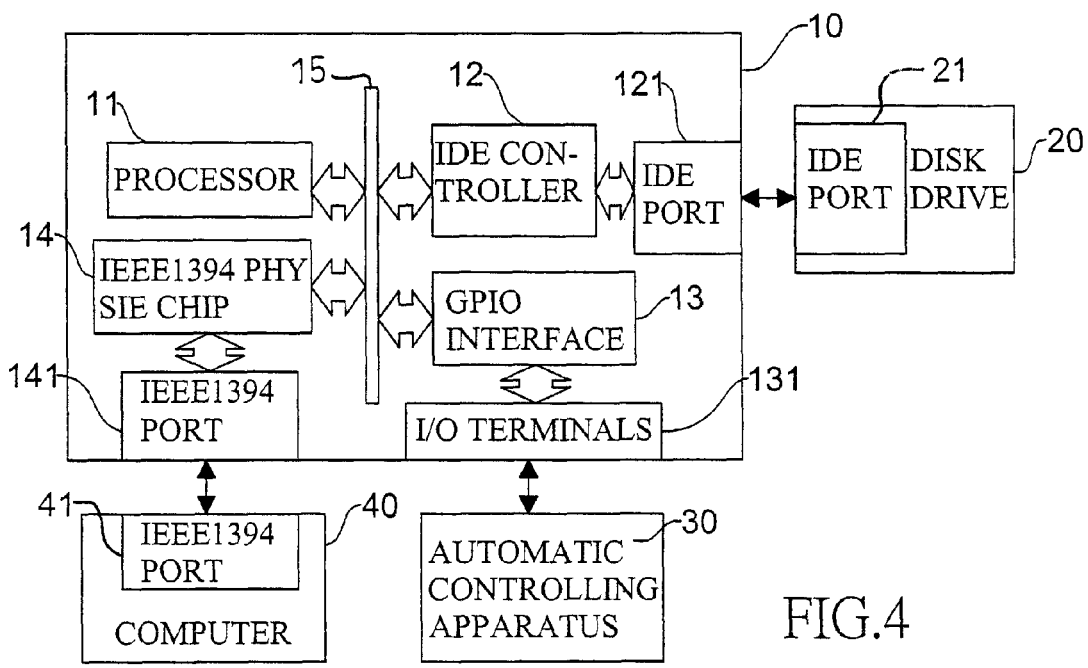
FIG. 4 is a functional block diagram of a fourth embodiment of a bridge device of a disk drive in accordance with the present invention.

The disk connecting port (121) is used to connect to a communicating port (21) of the disk drive (20). The disk connecting port (121) is electronically connected to the disk connecting interface (12). The disk connecting interface (12) is further electronically connected to the processor (11) through the data bus (15). In this preferred embodiment, the disk connecting interface (12) is a serial advanced technology attachment physical layer (hereinafter SATA PHY) controller so the disk connecting port (121) is a SATA port. With reference to FIGS. 2 and 4, the disk connecting interface (12) is an integrated development environment (hereinafter IDE) controller so the disk connecting port (121) is an IDE port.

The I/O terminals (131) are used to connect to an external automatic controlling apparatus (30). The I/O terminals (131) are electronically connected to the disk tray controlling interface (13). The disk tray controlling interface (13) is electronically connected to the processor (11) through the data bus (15). In this preferred embodiment, the disk tray controlling interface (13) is a general purpose input and output (hereinafter GPIO) interface. The I/O terminals (131) has one input terminal and one output terminal or may have a first and second input terminals and a first and second output terminals. In first case, for example, the GPIO interface (13) defines that a high voltage "1" of one output terminal represents to the present disk tray in IN status and a low voltage "0" of the output terminal represents to the present disk tray in OUT status. The GPIO interface (13) also defines that a negative transition "1->0" of one input terminal represents to control the disk tray to move out, and a positive transition "0->1" of the input terminal represents to control the disk tray to move in. In the second case, for example, the GPIO interface (13) determines that a high voltage "1" of a first output terminal represents to the present disk tray in OUT status and a high voltage "1" of a second output terminal represents to the present disk tray in IN status. The GPIO interface (13) also defines that a high voltage "1" of a first input terminal represents to control the disk tray to move out and a high voltage "1" of a second input terminal represents to control the disk tray to move in.

Figure 3:
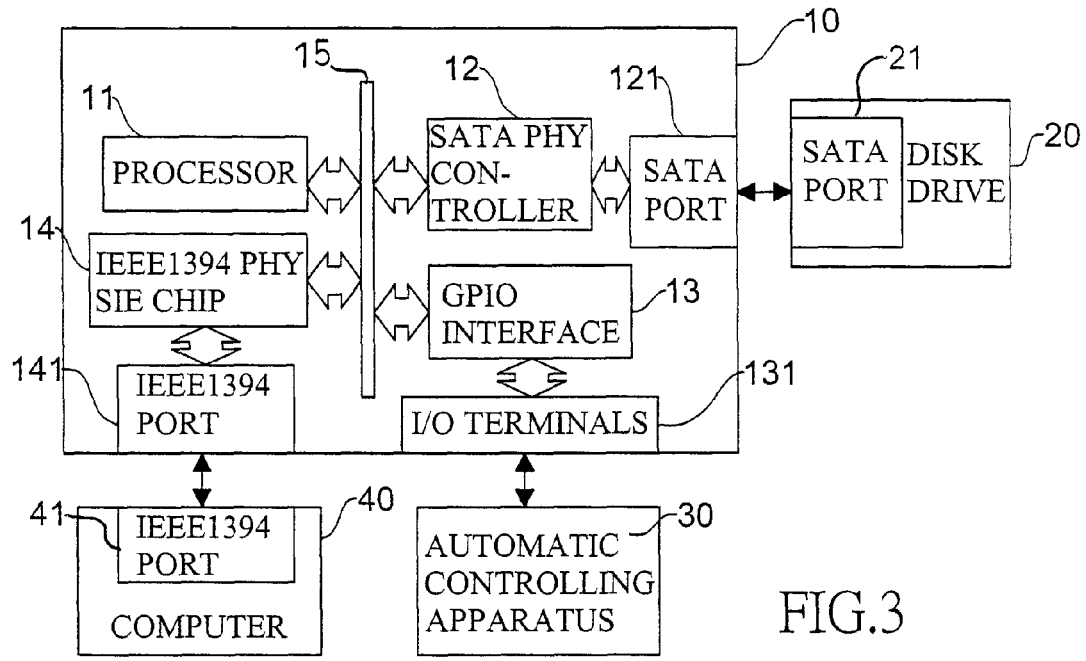
FIG. 3 is a functional block diagram of a third embodiment of a bridge device of a disk drive in accordance with the present invention.

The computer connecting port (141) is used to connect to a corresponding communicating port (41) of a computer (40). The computer connecting port (141) is electronically connected to the computer connecting interface (14). The computer connecting interface (14) is further electronically connected to the processor (11) through the data bus (15). In this preferred embodiment, the computer connecting interface (14) is a universal serial bus physical layer serial interface engine (USB PHY SIE) chip, so the computer connecting port (141) is a USB port. With reference to FIGS. 3 and 4, the computer connecting interface (14) is an IEEE 1394 PHY chip so the computer connecting port (141) is an IEEE 1394 port.

The processor (11) having a first decoding and encoding procedure and a second decoding and encoding procedure. The processor (11) executes the first decoding and encoding procedure to dual-convert a first data format for the disk connecting interface (12) to a second data format for the disk tray controlling interface (13). The processor (11) executes the second decoding and encoding procedure to dual-convert a first data format for the disk connecting interface (12) to a third data format for the computer connecting interface (14). With reference to FIGS. 1 to 4, there are many types of the disk connecting interface (12) and the computer connecting interface (14), so the processor (11) pre-stores at least two data format therein, (such as SATA format and USB format or IDE format and USB format or SATA format and IEEE1394 format or IDE format and IEEE1394 format) to execute the first and/or second decoding and encoding procedure.

Figure 5:
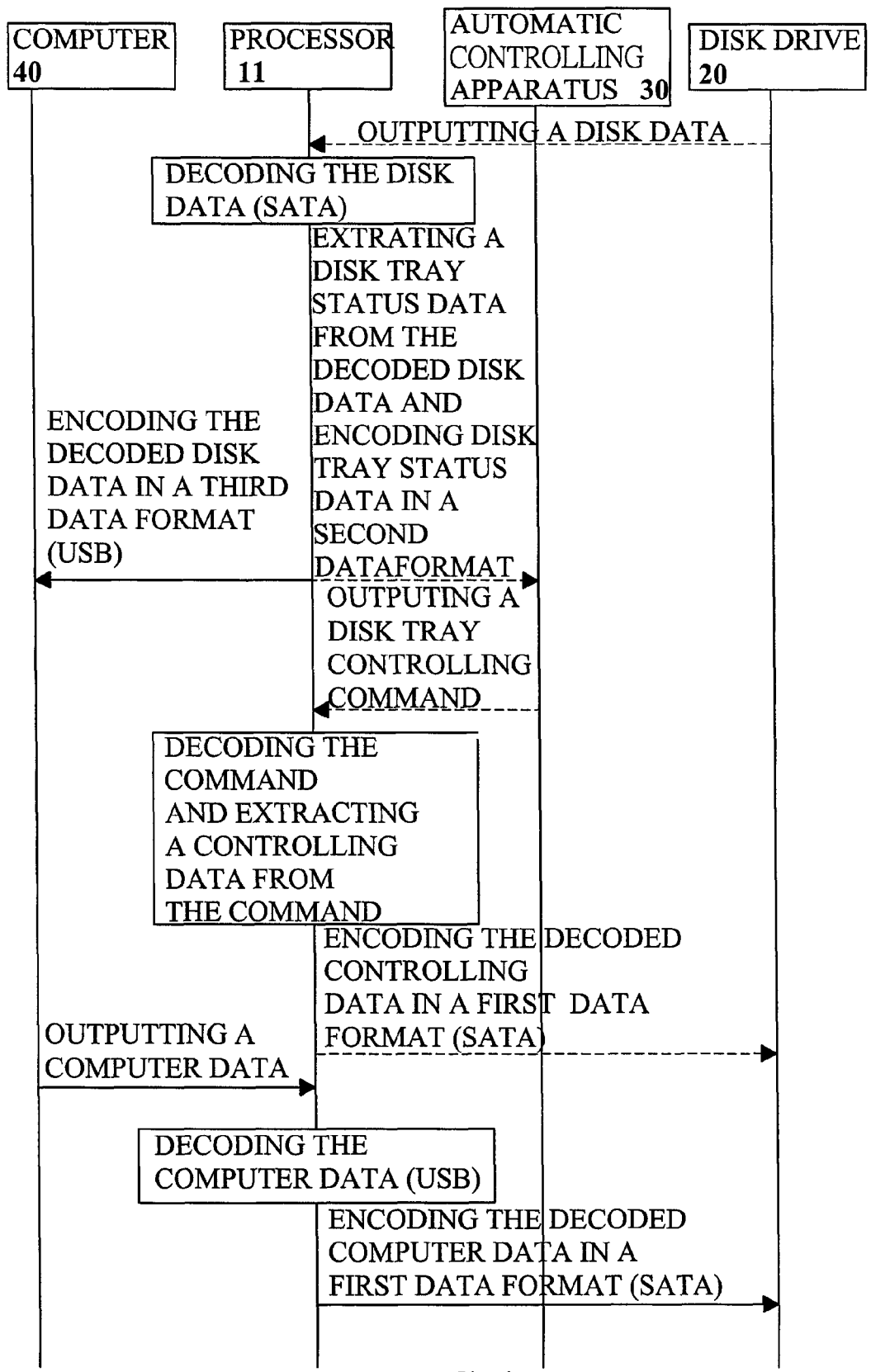
FIG. 5 is a flow chart of a first and second decoding and encoding procedures of a processor of the bridge device in accordance with the present invention.
Figure 6:
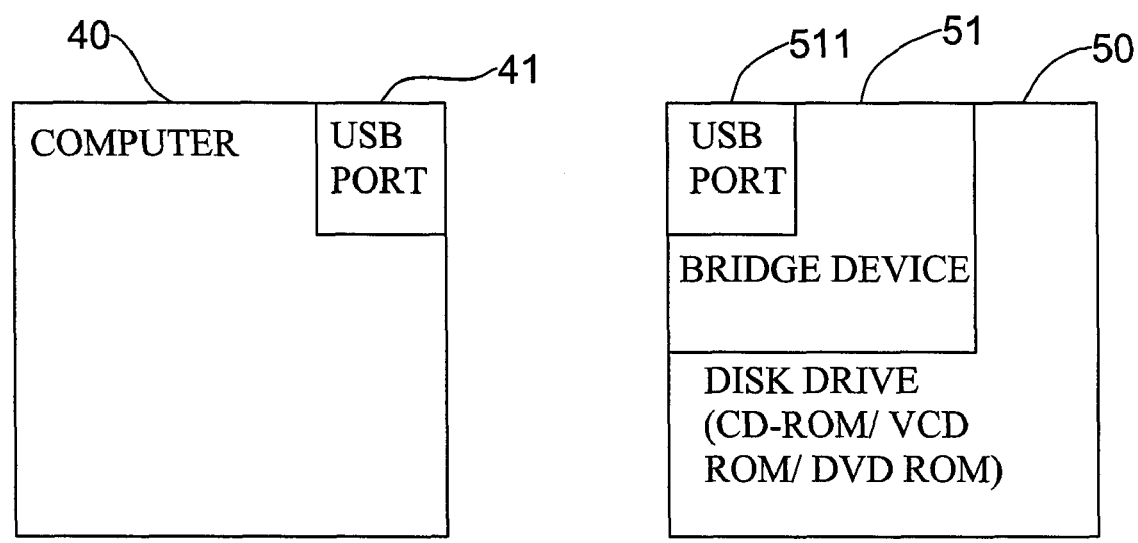
FIG. 6 is a functional block diagram of a conventional bridge device of a disk drive in accordance with the prior art.

With further reference to FIG. 5, the first decoding and encoding procedure is executed after the processor (11) detects that the disk connecting interface (12) receives the disk data from the disk drive through disk connecting port (SATA port/IDE port). After the processor (11) receives the disk data, the processor (11) decodes the disk data and then extracts a disk tray status data from the decoded disk data. The processor (11) further encodes the disk tray status data to a disk status response data in the second data format, so the disk tray controlling interface (13) successfully obtains the disk status response data in the second data format from the processor (11). Therefore, the external automatic controlling apparatus (30) obtains the preset disk tray status (IN or OUT) through the output terminals of the I/O port.

When the external automatic controlling apparatus (30) outputs a disk tray controlling command to the disk tray controlling interface (13) through the input terminal, the processor (11) decodes the disk tray controlling command and then extracts a controlling data from the decoded disk tray controlling command according to the second data format. Then the processor (11) encodes the controlling data in the first data format, and then outputs the controlling data in the first data format to the disk connecting interface (12). Therefore, the disk drive (20) successfully receives the controlling data from the external automatic controlling apparatus (30) and then drives the disk tray to move in or move out according to the controlling data.

After the processor (11) receives the disk data from the disk connecting interface (12), the processor (11) simultaneously decodes the decoded disk data in the third data format. Then the processor (11) outputs the decoded disk data in the third data format to the computer connecting interface (14), so the external computer (40) successfully receives the disk data from the disk drive (20) through the computer connecting port (141) (USB port/IEEE1394 port).

When the processor (11) detects that the computer connecting interface (14) outputs a computer data in the third data format, the second decoding and encoding procedure is executed. The processor (11) decodes the computer data from the computer (40) and then encodes the decoded computer data in the first data format, so the disk connecting interface (12) transmits the decoded computer data in the first data format to the disk drive (20).

Based on the foregoing description, the bridge device (10) in accordance with the present invention has the I/O terminals (131), to which the external automatic controlling apparatus (30) is connected, so the external automatic controlling apparatus (30) directly controls disk tray of the disk drive (20) to move in or move out without the computer. In addition, the bridge device (20) further has a computer connecting port (14), to which the external computer (40) is connected. The computer (40) also drives the disk drive (20).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A bridge device for an external disk drive, wherein the disk drive has a disk tray and the bridge device allows an external automatic controlling apparatus to only control the disk tray of the disk drive to move in and out, and to obtain the present status of the disk tray, and the bridge device comprises:
   a disk connecting port connected to an external computer connector of the external disk drive;
   a disk connecting interface electronically connected to the connecting port;
   a disk tray controlling interface being different from the disk connecting interface and connected to the external automatic controlling apparatus that outputs a disk tray controlling command to automatically drive the disk tray to move in and move out; and
   a processor electronically and respectively connected to the disk connecting interface and the disk tray controlling interface and having a first decoding and encoding procedure, wherein the processor executes a bidirectional conversion between a first data format for the disk connecting interface and a second data format for the disk tray controlling interface using the first decoding and encoding procedure to control the disk tray of drive disk to move in and move out, and obtain a disk tray status, wherein the processor further outputs the disk tray status to the disk connecting interface, wherein the first data format and second data format are different,
   a computer connecting port connected to an external computer;
   a computer connecting interface electronically connected to the processor;
   the processor having a second decoding and encoding procedure, wherein the processor executes a bidirectional conversion between the first data format for the disk connecting interface and a third data format for the computer connecting interface using the second decoding and encoding procedure, and
   wherein the computer connecting interface is a universal serial bus physical layer serial interface engine (USB PHY SIE) chip or an IEEE 1394 physical layer (PHY) chip, the computer connecting port is a USB port or an IEEE 1394 port.

2. The bridge device as claimed in claim 1, wherein the disk tray controlling interface is a general purpose input and output (GPIO) interface and comprises:
   an input terminal controlling a disk tray to move in and move out; and
   an output terminal reporting that a disk tray is in IN and OUT status.

3. The bridge device as claimed in claim 1, wherein the disk tray controlling interface is a general purpose input and output (GPIO) interface and comprises:
   a first input terminal controlling a disk tray to move in;
   a second input terminal controlling a disk tray to move out;
   a first output terminal reporting that a disk tray is in IN status; and
   a second output terminal reporting that a disk tray is in OUT status.

4. The bridge device as claimed in claim 1, wherein the disk connecting interface is a serial advanced technology attachment physical layer (SATA PHY) controller or an integrated development environment (IDE) controller and the disk connecting port is a SATA port or an IDE port.

5. The bridge device as claimed in claim 2, wherein the disk connecting interface is a serial advanced technology attachment physical layer (SATA PHY) controller or an integrated development environment (IDE) controller and the disk connecting port is a SATA port or an IDE port.

6. The bridge device as claimed in claim 3, wherein the disk connecting interface is a serial advanced technology attachment physical layer (SATA PHY) controller or an integrated development environment (IDE) controller and the disk connecting port is a SATA port or an IDE port.

* * * * *